Patented Aug. 7, 1945

2,380,996

UNITED STATES PATENT OFFICE 2,380,996

PREPARATION OF ORGANOSILICON HALIDES

Eugene G. Rochow and Winton I. Patnode, Schenectady, N. Y., assignors to General Electric Company, a corporation of New York No Drawing. Application September 26, 1941, Serial No. 412,460

13 Claims. (Cl. 260—607)

This invention relates to the preparation of organosilicon halides and more particularly to the production of hydrocarbon-substituted silicon halides.

In the copending application of Eugene G. Rochow, Serial No. 412,459, filed concurrently herewith and assigned to the same assignee as the present invention, is disclosed and broadly claimed the method of preparing organosilicon halides, more particularly hydrocarbon-substituted silicon halides, which comprises effecting reaction between silicon and a hydrocarbon halide.

The present invention differs from the invention claimed in the above-identified Rochow application in that it is directed specifically to a method of preparing hydrocarbon-substituted silicon halides, e. g., methyl silicon chlorides, wherein is utilized a solid, porous contact mass of the kind disclosed and claimed in the copending application of Winton I. Patnode, Serial No. 412,461, also filed concurrently herewith and assigned to the same assignee as the present invention.

It was known prior to our invention that hydrocarbon halides could be caused to react with elements other than silicon. For example, the reaction of hydrocarbon halides with magnesium in certain solvents to yield the so-called "Grignard reagent" is well known. Another example is the reaction of zinc or the zinc-copper couple with alkyl halides to give alkyl zinc halides similar in chemical behavior to the Grignard reagent. Zinc dimethyl also has been prepared by heating zinc with methyl bromide or iodide in liquid state in a sealed tube. All such reactions are liquid phase reactions.

The reaction of hydrogen chloride with silicon also was known. Thus, Combes [Compt. rend., 122, 531 (1896)] obtained a mixture of approximately 80% trichlorosilane (silicochloroform) and 20% silicon tetrachloride by passing hydrogen chloride through an iron tube filled with silicon heated to 300° to 440° C.

It also was known prior to our invention that various hydrocarbon-substituted silicon halides could be produced. The known methods of preparing such substituted silicon halides generally have involved the use of the well-known Grignard reagent. Such a method of preparing methyl silicon chlorides is described, for example, in Rochow copending application Serial No. 287,787, filed August 1, 1939. The present invention provides an improved process for producing hydrocarbon-substituted silicon halides at lower cost than is possible by the use of the Grignard reagent.

Briefly described, our invention resides in the improved method of preparing organosilicon halides, more particularly hydrocarbon-substituted silicon halides, e. g., alkyl silicon chlorides, bromides, etc., aryl silicon chlorides, bromides, etc., which comprises effecting reaction between a hydrocarbon halide, e. g., an alkyl chloride, bromide, etc., an aryl chloride, bromide, etc., and the silicon component of a solid, porous contact mass comprising essentially silicon and a metallic catalyst (e. g., copper) for the reaction. Advantageously we use a mass of solid, porous contact bodies obtained by firing under reducing conditions a molded mixture of powdered silicon and a powdered metallic catalyst for the reaction between silicon and a hydrocarbon halide.

One specific method feature of our invention is the new and improved method of preparing, for example, methyl silicon chlorides which comprises bringing methyl chloride, more particularly gaseous methyl chloride, into contact with a mass of solid, porous, molded bodies comprising essentially silicon and copper or other metallic catalyst for the reaction between silicon and a hydrocarbon halide, heating the said methyl chloride and silicon-containing mass at a temperature sufficiently high to effect reaction between the said methyl chloride and the silicon of the said mass, and recovering the methyl silicon chlorides.

Another specific method feature of this invention is the method which comprises causing gaseous methyl chloride or other hydrocarbon halide in gaseous or vapor state to react with the silicon component of a solid, porous contact mass obtained by firing under reducing conditions porous bodies formed, as by molding, from a mixture of powdered silicon and powdered copper or other metallic catalyst for the reaction, said reaction being carried out within the temperature range of 200° to 500° C. or more, and recovering the hydrocarbon-substituted silicon halides. For example, the effluent gaseous reaction products may be cooled by suitable means to obtain a condensate comprising hydrocarbon-substituted silicon halides, specifically methyl silicon chlorides.

It was quite surprising and unexpected to find that a hydrocarbon-substituted silicon halide could be produced by reaction between a hydrocarbon halide and the silicon component of a solid, porous contact mass consisting substantially of silicon and a metallic catalyst for the reaction, especially in view of the fact that silicon is commonly considered to be a metalloid and shows little or no resemblance to zinc, sodium, magnesium and the other highly electropositive metals heretofore known to react with hydrocarbon halides.

In order that those skilled in the art better may understand how the present invention may be carried into effect, the following illustrative examples thereof are given, all percentages are by weight.

Example 1

A stream of gaseous methyl chloride was passed into a heated tube where it contacted a solid, porous, molded contact mass prepared as follows: Silicon crushed to pass a 60-mesh standard screen was mixed with fine copper powder in the ratio of, by weight, 80 parts of the former to 20 parts of the latter. The resulting uniform mixture was pressed into cylindrical pills or pellets ½-inch in diameter by ⅜-inch in height. The pellets were fired in hydrogen for 2 hours at 1050° C.

A reaction temperature of the order of 280° C. was maintained within the tube. The products passing from the exit end of the reaction tube were condensed at a temperature of the order of minus 12° C.

The following data were obtained during the test:

| | |
|---|---|
| Total reaction time, hours | 168 |
| Pounds of product per hour | 0.381 |
| Pounds of product per pound of methyl chloride | 0.518 |
| Pounds of product per pound of contact mass | 3.12 |
| Pounds of product per pound of silicon used | 4.93 |
| Per cent silicon used | 79.3 |

The figures for utilization of materials are based upon the entire reaction period, which includes the efficient operation at the beginning of the run, as well as the inefficient operation at the end when the silicon in the contact mass is nearly depleted. Maximum yield of the product, which comprises a mixture of methyl chlorosilanes (methyl silicon chlorides), during the most efficient stages of the operation are approximately 50 per cent greater than shown above for the pounds of product obtained per pound of methyl chloride. Fractionation of the condensate showed that it consisted mainly of dimethyl dichlorosilane (dimethyl silicon dichloride) and methyl trichlorosilane (methyl silicon trichloride).

Example 2

Same as Example 1 with the exception that a reaction temperature of the order of 300° C. was maintained in the tube. The following data were obtained during the test:

| | |
|---|---|
| Total reaction time, hours | 140 |
| Pounds of product per hour | 0.401 |
| Pounds of product per pound of methyl chloride | 0.626 |
| Pounds of product per pound of contact mass | 2.65 |
| Pounds of product per pound of silicon used | 5.05 |
| Per cent silicon used | 64.4 |

As in Example 1, the above figures are based on the total reaction period.

Example 3

A stream of gaseous methyl chloride was passed into a heated tube where it contacted a porous, solid contact mass produced by molding a mixture of 90 per cent powdered silicon and 10 per cent powdered copper into the form of pellets. (The comminuted silicon was of such fineness that approximately 80 per cent passed through a 325-mesh standard screen while approximately 20 per cent was retained on the screen. The comminuted copper was of approximately 400-mesh particle size.) A reaction temperature of 350° C. was maintained within the tube. The products passing from the exit end of the reaction tube were condensed. A typical condensate contains the following compounds in approximately the stated percentages:

| | Per cent |
|---|---|
| Methyl silicon trichloride | 42 |
| Dimethyl silicon dichloride | 33 |
| Trimethyl silicon chloride | 7 to 15 |
| Silicochloroform | 2 to 4 |
| Silicon tetramethyl | 1 to 2 |
| Methyl dichlorosilane | Trace |

Example 4

A stream of gaseous methyl chloride was passed into a heated tube where it contacted a porous, solid, molded, reduced contact mass prepared from a mixture of, by weight, 80 parts powdered silicon and 20 parts powdered copper as described under Example 1. A reaction temperature of approximately 350° C. was maintained within the cube. The products passing from the exit end of the reaction tube were condensed. A typical condensate contains the following compounds in approximately the stated percentages:

| | Per cent |
|---|---|
| Dimethyl silicon dichloride | 78 |
| Methyl silicon trichloride | 6 to 12 |

Example 5

A stream of gaseous methyl chloride was passed into a heated tube where it contacted porous pellets produced by molding a mixture of 98 per cent powdered silicon and 2 per cent powdered copper. The molded pellets were fired in hydrogen for 20 minutes at 1030° to 1080° C. prior to use. A reaction temperature of approximately 350° C. was maintained within the reaction tube. The products passing from the exit end of the reaction tube were condensed. A typical condensate contains the following compounds in approximately the stated percentages:

| | Per cent |
|---|---|
| Dimethyl silicon dichloride | 79.5 |
| Methyl silicon trichloride | 5 to 7 |

Example 6

Methyl chloride in gaseous state was passed into a tube charged with porous pellets produced by molding a mixture of 90 per cent powdered silicon and 10 per cent powdered nickel. The molded pellets were fired in hydrogen for 15 minutes at 935° to 955° C. prior to use. A reaction temperature of approximately 350° C. was maintained within the tube. The products passing from the exit end of the reaction tube were condensed. A typical condensate contains the following compounds in approximately the stated percentages:

| | Per cent |
|---|---|
| Methyl silicon trichloride | 48 |
| Dimethyl silicon dichloride | 13.5 |
| Silicon tetrachloride | 10 to 20 |
| Silicochloroform | 5 to 10 |

Example 7

Methyl chloride in gaseous state was passed into a tube charged with porous pellets produced by molding a mixture of 90 per cent powdered silicon and 10 per cent powdered antimony. The molded pellets were fired in hydrogen for 15 minutes at 620° C. A reaction temperature of the order of 350° C. was maintained within the reaction tube. A typical condensate contains the following compounds in approximately the stated percentages:

| | Per cent |
|---|---|
| Methyl silicon trichloride | 30 to 65 |
| Dimethyl silicon dichloride | 5 |
| Silicon tetrachloride | 5 to 20 |

Example 8

Ethyl chloride was allowed to evaporate into a tube filled with a solid, porous, molded contact mass produced by molding a mixture of 90 per cent powdered silicon and 10 per cent powdered copper in the form of pellets. The mold-pellets were fired in hydrogen at 1050° C. for 2 hours. The reaction temperature was maintained at 300° to 325° C. The reaction products condensed in the form of a yellow, fuming liquid which, upon fractional distillation, was found to contain approximately 27 per cent ethyl silicon trichloride, 26 per cent diethyl silicon dichloride and 37 per cent silicon tetrachloride.

Example 9

A glass tube was packed with porous copper-silicon pellets prepared as described under Example 1. The tube was heated in a combustion furnace while a slow stream of methyl bromide was passed through it. At approximately 275° C. reaction occurred between the methyl bromide and the silicon. A yellow liquid was readily condensed from the unreacted methyl bromide. From this liquid, methyl tribromosilane (boiling point 133.5° C.) and dimethyl dibromosilane (boiling point 112.3° C.) were isolated by fractional distillation.

Example 10

A glass tube was packed with porous copper-silicon pellets prepared as described under Example 1. The tube, inclined slightly downward, was heated to 280° to 300° C. while ethyl bromide was allowed to drip into it. The products from the tube were condensed, yielding a yellow liquid comprising ethyl silicon bromides.

Example 11

Methyl iodide was allowed to drip into a sloping reaction tube charged with porous pellets formed from a mixture of 90 per cent silicon and 10 per cent copper and fired in hydrogen as described under Example 1. The tube was heated within the temperature range of 300° to 310° C. Fifty-seven (57) grams of methyl iodide were passed into the heated tube over a period of 2 hours. A dark red liquid issued from the condenser affixed to the reaction tube. This liquid was distilled at atmospheric pressure. Besides unreacted methyl iodide, there was obtained a high-boiling liquid comprising methyl silicon iodides.

Example 12

Gaseous methyl fluoride was passed into a tube filled with porous pellets formed of 90 per cent silicon and 10 per cent copper and fired in hydrogen as described under Example 1. The reaction tube was heated at a temperature of the order of 370° C. The products passing from the exit end of the tube were condensed. The condensate comprised unreacted methyl fluoride and methyl silicon fluorides.

A porous contact mass was made by first mixing together about 80 per cent by weight comminuted silicon with about 20 per cent by weight comminuted copper. The mixture was pressed into the form of bars, which thereafter were sintered in a hydrogen atmosphere at a temperature of about 1050° C. The sintered bars were broken up into lumps approximately ¼-inch in size. A vertical reaction tube was charged with these lumps. Bromobenzene was allowed to drip into the reaction tube, which was maintained within the temperature range of 380° to 475° C. The bromobenzene, therefore, was in the vapor phase during the reaction period. The products passing from the exit end of the reaction tube were condensed, yielding a condensate comprising phenyl silicon bromides.

It will be understood, of course, by those skilled in the art that our invention is not limited to the specific hydrocarbon halides named in the above illustrative examples and that any other hydrocarbon halide may be employed as a reactant with the silicon, the conditions of reaction generally being varied depending upon the particular starting hydrocarbon halide and the particular end-products desired to be obtained. Although not limited thereto, the vapor phase reactions are preferred because they can be carried out more economically, may be controlled more easily and may be directed to the production of the desired organo-silicon halides with a minimum of by-products.

Likewise the invention is not limited to the specific temperatures or temperature ranges mentioned in the examples. However, the reaction temperature should not be so high as to cause an excessive deposition of carbon upon the unreacted silicon during the reaction. In general, the reaction temperature to be used will vary with, for example, the particular hydrocarbon halide employed, the particular catalyst used and the yields of the specific reaction products desired to be obtained from a particular starting hydrocarbon halide. For example, by varying the temperature of reaction within the temperature range of, say, 200° to 500° C., the proportions of the individual products obtained when methyl chloride is brought into contact with silicon can be varied and, also, the overall rate of reaction. At temperatures of the order of 200° C. the reaction proceeds much more slowly than at reaction temperatures around 250° to 400° C. At temperatures much above 400° C., in the case of methyl chloride for example, there is a vigorous exothermic reaction which generally results in an undesirable deposition of carbon on the contact mass, thereby lessening its efficiency. Although methyl silicon chlorides in varying yields can be produced by effecting reaction between methyl chloride and the silicon component of the solid, porous contact mass at various temperatures within the temperature range of 200° to 500°, optimum results usually are obtained within the more limited range of 250° to 400° C.

The solid, porous contact masses used in carrying our invention into effect may be produced, for example, by molding a mixture comprising essentially silicon and a metallic catalyst for the reaction between silicon and a hydrocarbon halide. Examples of such catalysts are copper, nickel, tin, antimony, manganese, silver and titanium. We advantageously may use solid, porous contact bodies obtained by firing under reducing conditions a molded mixture of powdered silicon and a powdered metallic catalyst for the reaction, specifically copper. The molded mass is fired in a reducing atmosphere at a temperature sufficiently high and for a period sufficiently long to activate the potentially active catalyst, if initially it is catalytically inactive, or to increase its activity, if initially it is not so catalytically active as may be desired. This heat treatment increases the hardness and mechanical strength of the contact mass, but is not so drastic as to cause the porous mass to be converted into a non-porous body. During this firing treatment, any reducible components, e. g., metallic oxides, in the contact mass are reduced. The fired mass is cooled in a non-oxidizing atmosphere to a temperature at or approaching normal temperatures.

Another method of producing the porous, solid contact masses used in carrying the present invention into effect is to form a uniform mixture of powdered silicon and powdered metallic catalyst, and fire this mixture in a reducing atmosphere at a temperature sufficiently high to effect sintering thereof and to impart rigidity thereto. The fired mass then is broken up to obtain porous lumps of a desired size.

As pointed out in Patnode application Serial No. 412,461, wherein the contact masses employed in practicing the present invention are more fully described and specifically claimed, the proportions of components constituting these contact masses may be varied considerably. Preferably, however, the solid, porous contact masses consist substantially of a preponderant proportion of silicon and a minor proportion of copper or other metallic catalyst for the reaction between silicon and a hydrocarbon halide. A more specific example of such a contact mass is the product of firing under reducing conditions a molded mixture of, by weight, from 2 to 45 per cent powdered metallic catalyst, specifically copper, and from 98 to 45 per cent powdered silicon. Particularly good results from a practical standpoint are obtained with solid, porous contact bodies produced by firing under reducing conditions a molded mixture of, by weight, from 5 to 25 per cent powdered copper and from 95 to 75 per cent powdered silicon.

With further reference to the production of methyl silicon chlorides as described in a number of the examples, it may be said that the efficient utilization of methyl chloride is enhanced as the proportion of the metallic catalyst, specifically copper, is increased up to about 10 per cent and that no material advantage from the standpoint of maximum yield of reaction products per pound of methyl chloride ordinarily accrues from using solid, porous contact masses containing much over 20 or 25 per cent copper. The rate of conversion of the methyl chloride to methyl silicon chlorides falls off as the silicon is used up, but it falls off much more rapidly when contact masses of low copper content (e. g., from 1 to 5 per cent) are used. These facts are substantiated by the data shown below:

|  | Per cent copper in solid, porous contact mass | | | |
| --- | --- | --- | --- | --- |
|  | 2.5 | 5 | 10 | 20 |
| Pounds product per pound CH₃Cl at beginning of run | 0.63 | 0.71 | 0.77 | 0.73 |
| Pounds product per pound CH₃Cl at middle of run | 0.29 | 0.43 | 0.59 | 0.63 |
| Pounds product per pound CH₃Cl when reaction period is 80 per cent completed | 0.23 | 0.36 | 0.43 | 0.45 |
| Pounds product per 120 pounds methyl chloride charged to reaction tube during total reaction period | 43.0 | 55.0 | 64.5 | 63.5 |

The effect of variations in the compositions of the contact masses used in practicing the present invention upon the composition of the condensate containing the products of reaction will be noted by comparing the yields of individual compounds present in the condensates of Examples 3 to 7, inclusive.

By effecting reaction between a hydrocarbon halide and silicon when the latter is in the form of a solid, porous contact mass (preferably a solid, porous, molded, reduced contact mass), consisting essentially of silicon and a metallic catalyst for the reaction, e. g., copper, the reaction proceeds more satisfactorily and with better control of the process and of the products of reaction than when the silicon and catalyst are associated together in other form.

The present invention provides a new and improved method for the production of alkyl silicon halides (e. g., methyl, ethyl, propyl, butyl, amyl, isoamyl, hexyl, etc., silicon halides), the aryl silicon halides (e. g., phenyl silicon halides, etc.), the aryl-substituted aliphatic silicon halides (e. g., phenylethyl silicon halides, etc.) and the aliphatic-substituted aryl silicon halides (e. g., tolyl silicon halides, etc.).

The products of this invention have utility as intermediates in the preparation of other products. For instance, they may be employed as starting materials for the manufacture of silicon resins. They also may be used as agents for treating water-non-repellent bodies to make them water-repellent as disclosed and claimed in the copending application of Winton I. Patnode, Serial No. 365,983, filed November 16, 1940, and assigned to the same assignee as the present invention. They also may be employed for treating glass fibers in continuous filament or other form.

What we claim as new and desire to secure by Letters Patent of the United States is:

1. The method of preparing organosilicon halides which comprises effecting reaction between a hydrocarbon halide and the silicon component of a solid, porous contact mass obtained by firing under reducing conditions a mixture of powdered silicon and a powdered metallic catalyst for the said reaction.

2. The method of preparing organosilicon halides which comprises effecting reaction between a hydrocarbon halide in a vapor state and the silicon component of a solid, porous contact mass obtained by firing under reducing conditions a mixture of powdered silicon and a powdered metallic catalyst for the said reaction.

3. The method of preparing alkyl silicon chlorides which comprises effecting reaction between an alkyl chloride and the silicon component of solid, porous contact bodies obtained by firing under reducing conditions a molded mixture of powdered silicon and a powdered metallic catalyst for the said reaction.

4. The method of preparing aryl silicon halides which comprises effecting reaction between an aryl halide and the silicon component of solid, porous contact bodies obtained by firing under reducing conditions a molded mixture of powdered silicon and a powdered metallic catalyst for the said reaction.

5. The method of preparing phenyl silicon halides which comprises effecting reaction between halogenated benzene and the silicon component of solid, porous contact bodies obtained by firing under reducing conditions a molded mixture of powdered silicon and copper.

6. The method of preparing hydrocarbon-substituted silicon halides which comprises effecting reaction between a hydrocarbon halide in a vapor state and the silicon component of a solid, porous contact mass obtained by firing under reducing conditions a molded mixture of powdered silicon and copper.

7. The method of preparing alkyl silicon chlorides which comprises effecting reaction between an alkyl chloride in a vapor state and the silicon component of a solid, porous contact mass obtained by firing a molded mixture of powdered silicon and copper under reducing conditions.

8. The method of preparing methyl silicon chlorides which comprises effecting reaction between methyl chloride and the silicon component of a solid, porous mass obtained by firing under reducing conditions a mixture of powdered silicon and a powdered metallic catalyst for the said reaction.

9. The method of preparing methyl silicon chlorides which comprises effecting reaction between methyl chloride and the silicon component of a solid, porous mass obtained by firing a powdered mixture of silicon and copper at a temperature sufficiently high to effect sintering thereof.

10. The method of preparing methyl silicon chlorides which comprises effecting reaction between gaseous methyl chloride and the silicon component of solid, porous contact bodies obtained by firing under reducing conditions a mixture of powdered silicon and powdered copper, the silicon constituting a preponderant proportion of the said mass.

11. The method of preparing methyl silicon chlorides which comprises effecting reaction between gaseous methyl chloride and the silicon component of a solid, porous contact mass obtained by firing under reducing conditions molded bodies formed from a mixture of, by weight, from 2 to 45 per cent powdered copper and from 98 to 55 per cent powdered silicon.

12. The method of preparing methyl silicon chlorides which comprises bringing gaseous methyl chloride into contact with a mass of solid, porous bodies obtained by firing at sintering temperatures and in a reducing atmosphere a powdered mixture of silicon and copper, heating the said methyl chloride and mass of bodies at a temperature sufficiently high to effect reaction between the methyl chloride and the silicon component of the said mass, and recovering the methyl silicon chlorides.

13. The method which comprises causing gaseous methyl chloride to react with the silicon component of a solid, porous contact mass obtained by firing under reducing conditions bodies formed from a mixture of powdered silicon and powdered copper, said reaction being carried out within the temperature range of 200° to 500° C., and cooling the effluent gases to obtain a condensate comprising methyl silicon chlorides.

EUGENE G. ROCHOW.
WINTON I. PATNODE.

CERTIFICATE OF CORRECTION.

Patent No. 2,380,996.                                   August 7, 1945.

EUGENE G. ROCHOW, ET AL.

It is hereby certified that error appears in the printed specification of the above numbered patent requiring correction as follows: Page 2, first column, line 10, Example 1, for "3/5-inch" read --3/8-inch--; and that the said Letters Patent should be read with this correction therein that the same may conform to the record of the case in the Patent Office.

Signed and sealed this 27th day of November, A. D. 1945.

Leslie Frazer (Seal)                             First Assistant Commissioner of Patents.

6. The method of preparing hydrocarbon-substituted silicon halides which comprises effecting reaction between a hydrocarbon halide in a vapor state and the silicon component of a solid, porous contact mass obtained by firing under reducing conditions a molded mixture of powdered silicon and copper.

7. The method of preparing alkyl silicon chlorides which comprises effecting reaction between an alkyl chloride in a vapor state and the silicon component of a solid, porous contact mass obtained by firing a molded mixture of powdered silicon and copper under reducing conditions.

8. The method of preparing methyl silicon chlorides which comprises effecting reaction between methyl chloride and the silicon component of a solid, porous mass obtained by firing under reducing conditions a mixture of powdered silicon and a powdered metallic catalyst for the said reaction.

9. The method of preparing methyl silicon chlorides which comprises effecting reaction between methyl chloride and the silicon component of a solid, porous mass obtained by firing a powdered mixture of silicon and copper at a temperature sufficiently high to effect sintering thereof.

10. The method of preparing methyl silicon chlorides which comprises effecting reaction between gaseous methyl chloride and the silicon component of solid, porous contact bodies obtained by firing under reducing conditions a mixture of powdered silicon and powdered copper, the silicon constituting a preponderant proportion of the said mass.

11. The method of preparing methyl silicon chlorides which comprises effecting reaction between gaseous methyl chloride and the silicon component of a solid, porous contact mass obtained by firing under reducing conditions molded bodies formed from a mixture of, by weight, from 2 to 45 per cent powdered copper and from 98 to 55 per cent powdered silicon.

12. The method of preparing methyl silicon chlorides which comprises bringing gaseous methyl chloride into contact with a mass of solid, porous bodies obtained by firing at sintering temperatures and in a reducing atmosphere a powdered mixture of silicon and copper, heating the said methyl chloride and mass of bodies at a temperature sufficiently high to effect reaction between the methyl chloride and the silicon component of the said mass, and recovering the methyl silicon chlorides.

13. The method which comprises causing gaseous methyl chloride to react with the silicon component of a solid, porous contact mass obtained by firing under reducing conditions bodies formed from a mixture of powdered silicon and powdered copper, said reaction being carried out within the temperature range of 200° to 500° C., and cooling the effluent gases to obtain a condensate comprising methyl silicon chlorides.

EUGENE G. ROCHOW.
WINTON I. PATNODE.

CERTIFICATE OF CORRECTION.

Patent No. 2,380,996.    August 7, 1945.

EUGENE G. ROCHOW, ET AL.

It is hereby certified that error appears in the printed specification of the above numbered patent requiring correction as follows: Page 2, first column, line 10, Example 1, for "3/5-inch" read --3/8-inch--; and that the said Letters Patent should be read with this correction therein that the same may conform to the record of the case in the Patent Office.

Signed and sealed this 27th day of November, A. D. 1945.

Leslie Frazer (Seal)    First Assistant Commissioner of Patents.